United States Patent [19]
Cannon

[11] 3,881,493
[45] May 6, 1975

[54] SYNCHRONOUSLY REINFORCING PACER

[75] Inventor: Robert L. Cannon, Waltham, Mass.

[73] Assignee: American Optical Corporation, Southbridge, Mass.

[22] Filed: Feb. 7, 1974

[21] Appl. No.: 440,612

[52] U.S. Cl. ........................................... 128/419 PG
[51] Int. Cl. ............................................... A61n 1/36
[58] Field of Search ...... 128/419 P, 419 PG, 419 R, 128/421, 422, 423

[56] References Cited
UNITED STATES PATENTS

| | | | |
|---|---|---|---|
| 3,528,428 | 9/1970 | Berkovits | 128/419 P |
| 3,651,799 | 3/1972 | Daynard | 128/419 P |
| 3,656,487 | 1/1970 | Gobeli | 128/419 P |
| 3,717,153 | 2/1973 | Bowers | 128/419 P |

*Primary Examiner*—William E. Kamm
*Attorney, Agent, or Firm*—Joel Wall; William C. Nealon; H. R. Berkenstock, Jr.

[57] ABSTRACT

There is disclosed an external pacer for operating together with an improperly functioning implantable pacer. The external pacer operates in the demand mode; as in the case of an implantable demand pacer, when a heartbeat is detected the generation of a stimulating pulse is inhibited. However, the external pacer also includes a mechanism for sensing a stimulating pulse generated by the implantable pacer. When such a pacer pulse is detected, the external pacer immediately generates a pulse which reinforces the pulse generated by the implantable pacer.

10 Claims, 7 Drawing Figures

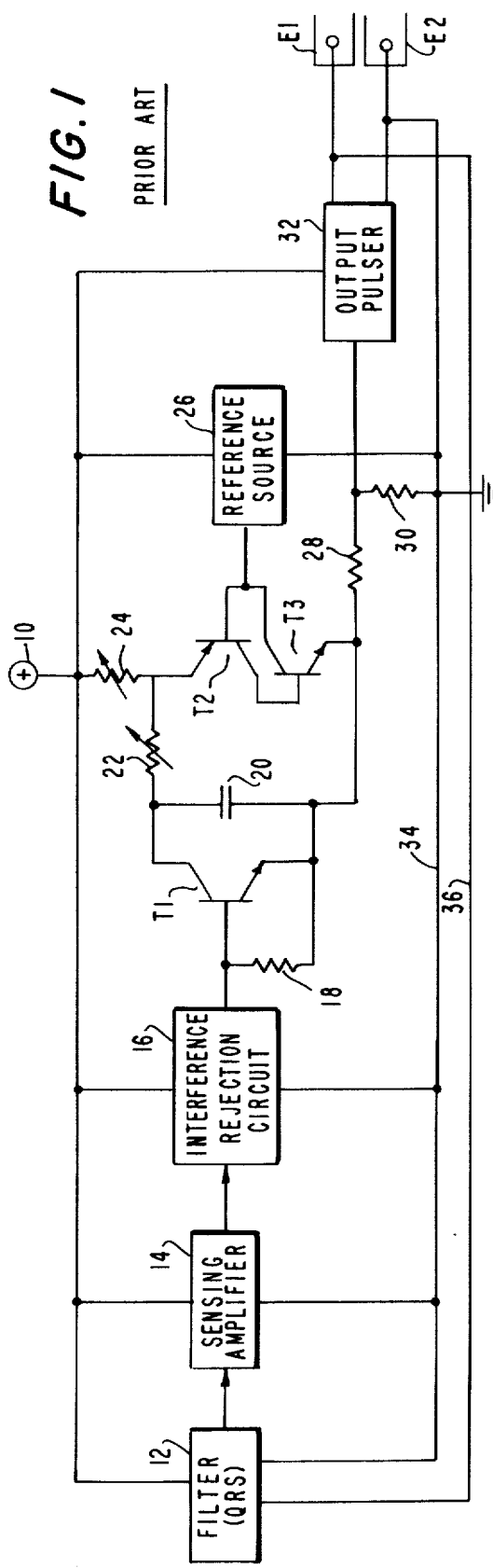
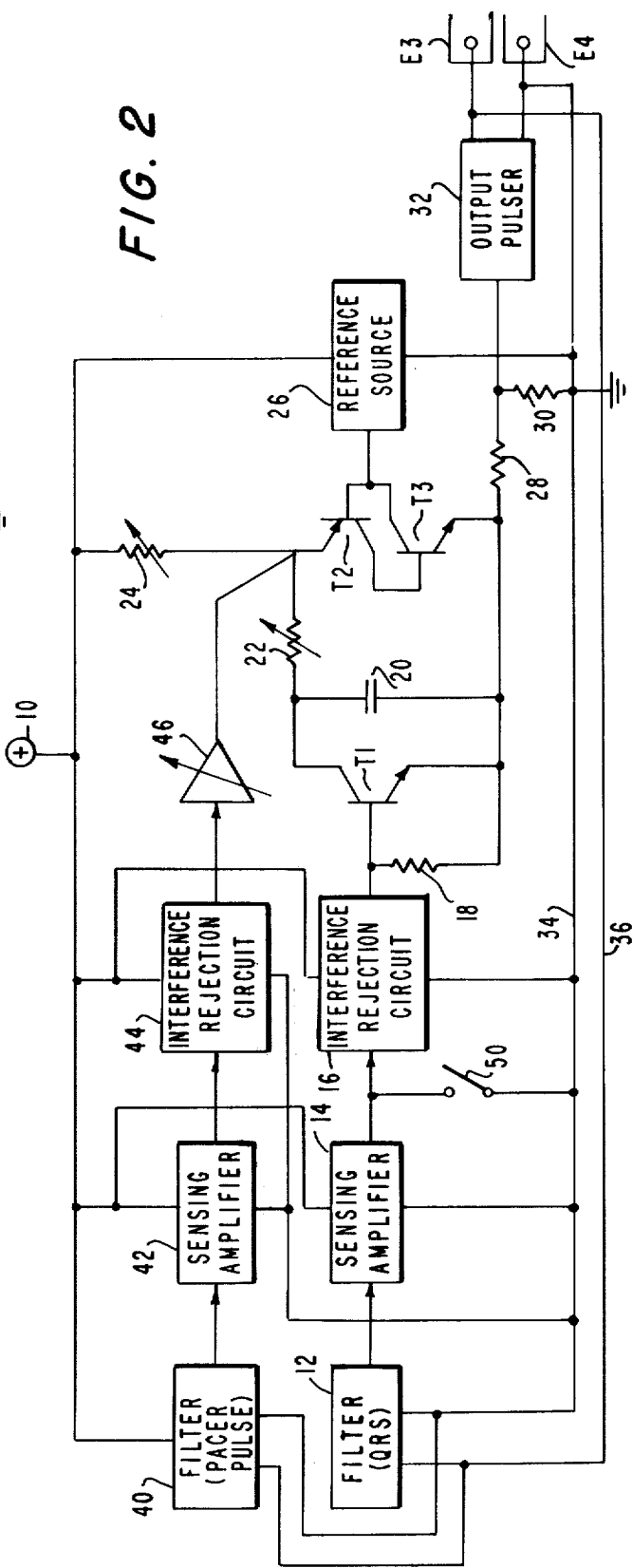

3,881,493

SYNCHRONOUSLY REINFORCING PACER

This invention relates to heart pacers, and more particularly to external pacers for operating in conjunction with improperly functioning implantable pacers.

A conventional demand pacer is designed to generate heart stimulating pulses at periodic intervals. However, whenever a spontaneous beat is detected, the next stimulating pulse which would otherwise be generated is inhibited, and a new timing cycle begins. In this manner, natural heartbeats and stimulated heartbeats occur with a regular periodicity; a stimulated heartbeat is "substituted" for a missing natural heartbeat.

An implantable pacer of this type has a limited life. As the years go by, the batteries in the pacer fail and the voltage supply for the pacer decreases. As the voltage supply decreases, three things usually go wrong with the pacer. First, the amplitude of the stimulating pulses decreases and some if not all of the pulses are unable to stimulate, or "capture," heartbeats. Second, the rate at which the pulses are generated usually changes. Third, the sensing amplifier which detects a natural heartbeat may cease to function; in such a case, the pacer operates in a continous mode and there may be "competition" between natural heartbeats and stimulating pulses. Of these three, the problem of greatest concern is that not all of the pacer pulses capture heartbeats, i.e., they are sub-threshold.

When such a condition arises, the pacer is replaced. However, there is almost always a time lag between the patient's entering a hospital and the surgical procedure. During this time interval, the patient is subject to great risks.

It is possible, of course, to utilize an external pacer while the patient is awaiting surgery. But if this pacer is operated in the continuous mode, there may be competition between the stimulating pulses of the external and implantable pacers. And there are also problems in using an external demand pacer. If the rate of the external pacer is made slower than the rate of the internal (implantable) pacer, the sensing amplifier of the external pacer may detect the implantable pacer stimulating pulses and the pulses from the external pacer will be inhibited — even though the amplitude of the pulses from the implantable pacer may not be sufficiently high to capture heartbeats. On the other hand, while it is possible to operate the external pacer at a rate which is faster than that of the implantable pacer, since the sensing amplifier of the internal pacer is usually malfunctioning toward the end of the operative life of the implantable pacer, pulses from the implantable pacer will not be inhibited following the generation of an external stimulating pulse, and there will be competition between the two pacers.

It is a general object of my invention to provide an external pacer which operates in synchronism with an implantable pacer for supplementing its operation, in a manner such that the external pacer pulses reinforce those of the implantable pacer.

Briefly, in accordance with the principles of my invention, I provide an external pacer whose rate of operation is set to be slightly slower than that of an implantable pacer whose sensing amplifier is not operative and whose pulse level is sub-threshold. If a natural heartbeat is detected, the pulse from the external pacer which would otherwise next occur is inhibited. But the external pacer is also provided with a mechanism for detecting a stimulating pulse which is generated by the implantable pacer. When such a pulse is detected, rather than inhibiting the next pulse from the external pacer which would otherwise be generated, that pulse is generated immediately. This pulse reinforces the pulse from the implantable pacer to insure that a heartbeat is captured.

Further objects, features and advantages of my invention will become apparent upon consideration of the following detailed description in conjunction with the drawing, in which:

FIG. 1 depicts schematically a prior art implantable pacer;

FIG. 2 depicts schematically the external pacer of my invention, which is used in conjunction with the type of pacer shown in FIG. 1 for reinforcing the stimulating pulses thereof.

Figure 3A:
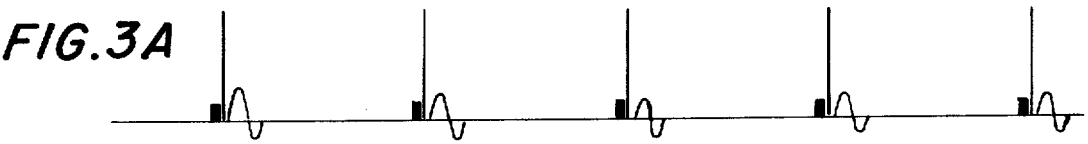
FIGS. 3A–3E depict various timing waveforms which will facilitate an understanding of the present invention.

The pacer of FIG. 1 includes a battery (a plurality of cells, not shown) connected in series for powering the unit. This battery is shown by a potential source 10, it being understood that the battery 10 is connected between the source shown and ground conductor 34.

Output pulser 32 is coupled to the two electrodes E1 and E2 which are implanted in the heart tissue, and the pulser applies stimulating pulses to the electrodes as is known in the art. The two electrodes are also coupled over conductors 34 and 36 to filter 12. This filter filters out the QRS waveforms and applies an input signal to the input of sensing amplifier 14 whenever a QRS waveform, corresponding to a ventricular beat, is detected. The signal is amplified and extended to the input of interference rejection circuit 16. Under ordinary circumstances, this circuit applies a positive pulse to the base of transistor T1, across resistor 18, whenever a spontaneous heartbeat is detected.

In the absence of spontaneous beats, transistor T1 remains off. In such a case, capacitor 20 charges from potential source 10, current flowing through resistors 24 and 22, the capacitor, and resistors 28 and 30. Transistors T2 and T3 are arranged in a standard configuration, with a reference potential, derived by reference source 26, being applied to the base of transistor T2. When the capacitor has charged sufficently to turn on transistors T2 and T3, the capacitor discharges through them and resistor 22. During the time that the two transistors conduct, current flows from source 10 through resistor 24, the two transistors and resistors 28 and 30. The positive potential developed across resistor 30 triggers the operation of output pulser 32.

In the absence of spontaneous heartbeats, stimulating pulses are thus applied to the patient's heart at periodic intervals. The inter-pulse interval is determined by the combined impedances of potentiometers 22 and 24, and the width of each stimulating pulse is determined by the impedance of potentiometer 22. As is known in the art, potentiometer 24 is adjusted prior to implantation to control the pacer rate, and potentiometer 22 is adjusted to control the pacer pulse width.

But whenever a spontaneous beat is detected and transistor T1 is turned on, capacitor 20 discharges through it. In such a case, the next stimulating pulse which would otherwise be generated is inhibited, and as soon as transistor T1 turns off, capacitor 20 starts to charge once again and a new timing cycle begins.

The purpose of interference rejection circuit 16 is to prevent the turning on of transistor T1 in the event "heartbeats" are detected at too rapid a rate. This is an indication that what is being detected is extraneous noise, rather than legitimate heartbeats, and interference rejection circuit 16 prevents each detected heartbeat from turning on transistor T1. In the presence of noise, the pacer is operated in the continuous mode — which is better than allowing it to be inhibited altogether because of the presence of noise.

The details of the pacer circuit are not important for an understanding of the present invention. Only the timing circuit has been shown since a similar, but modified, timing circuit is included in the external pacer of FIG. 2. For a comprehensive understanding of prior art pacer circuitry, reference may be made to Berkovits application Ser. No. 214,218 filed on Dec. 30, 1971 and issued on Sept. 11, 1973 bearing Pat. No. 3,757,791 and entitled SYNCHRONIZED ATRIAL AND VENTRICULAR PACER.

In the event the pacer circuit of FIG. 1 is not fully operative and requires replacement, it is not always sufficient to use an external pacer until the implantable pacer replacement is effected. If a continuous external pacer is used, it is apparent that there will be competition between its stimulating pulses and those of the implantable pacer (even though not all of the pulses from the implantable pacer will capture heartbeats), assuming that the sensing amplifier of the implantable pacer is not functioning. On the other hand, suppose that the external pacer is made to operate in the demand mode. In such a case, its rate will be either faster or slower than the rate of the implantable pacer. If the rate of the external pacer is slower, stimulating pulses from the implantable pacer may be detected and may inhibit the operation of the external pacer — including those implantable pacer pulses which do not capture heartbeats. On the other hand, if the rate of the external pacer is faster than that of the implantable pacer, were the implantable pacer operating properly each stimulating pulse from the external pacer would inhibit the generation of a pulse by the implantable pacer when the latter detected the external pulse. However, as an implantable pacer fails, what usually happens is that the sensing amplifier (unit 14 in FIG. 1) does not operate properly. In such a case, the implantable pacer generates pulses continuously and the two sequences of pulses compete with each other.

The external pacer of my invention, shown in FIG. 2, is basically the same as the prior art demand pacer of FIG. 1. However, there is added to the circuit a filter 40, a sensing amplifier 42, interference rejection circuit 44 and a variable gain amplifier 46. Filter 12 allows the QRS waveforms to pass through it and to be extended to the input of sensing amplifier 14. Filter 40 allows only pacer pulses which appear on leads 34 and 36 to be passed through it, for extension to sensing amplifier 42. The two filters are basically the same except that filter 12 has a bandpass centered at approximately 50 Hz, while filter 40 has a bandpass centered approximately at 2 kHz. Sensing amplifier 42 functions to amplify the detected pulses generated by the implantable pacer, and interference rejection circuit 44 discriminates between legitimate pulses and noise. In the absence of noise, each detected implantable pacer pulse is amplified by amplifier 46 and applied to the emitter of transistor T2. The reason for providing a variable gain amplifier will be described below. The additional switch 50 is provided to disable the sensing amplifier 14; when the switch is closed, the pacer operates in a continuous mode since transistor T1 is never turned on.

It is important to note that each detected QRS waveform results in the application of a positive pulse to the base of transistor T1 (when switch 50 is open). This, in turn, results in the discharge of capacitor 20, the inhibition of an external pacer pulse, and the start of a new timing cycle. On the other hand, whenever a pulse generated by the implantable pacer is detected, the positive pulse applied by amplifier 46 to the emitter of transistor T2 causes this transistor to turn on along with transistor T3. The effect is the same as that achieved when capacitor 20 charges to the firing level. With the two transistors turned on, the capacitor discharges through them (so that a new timing cycle can begin as soon as the transistors turn off), and output pulser 32 is triggered. The resulting pulse on electrodes E3 and E4 reinforces the pulse generated by the implantable pacer to insure that a heartbeat is captured.

How the pacer of FIG. 2 is used depends on whether sensing amplifier 14 in the internal pacer is still operating. If it is, i.e., the internal pacer is still operating in the demand mode even though its pulses are sub-threshold, then switch 50 is closed so that the external pacer is operated in the continuous mode and potentiometer 24 is adjusted so that the external pacer rate is faster than the internal pacer rate. In such a case, every pulse from the external pacer is detected by the internal pacer and inhibits the next internal pulse which would otherwise be generated. In fact, no internal pulses are generated and the pacing is under the exclusive control of the external pacer.

But if the sensing amplifier of the internal pacer has failed, variable potentiometer 24 of the external pacer is adjusted so that the external pacer rate is slightly slower than the rate of the implantable pacer. Whenever a spontaneous beat is detected, sensing amplifier 14, in the absence of noise, causes transistor T1 to turn on so that the timing cycle in progress is terminated without the generation of a reinforcing pulse by the external pacer. There is no need for such a pulse since a natural heartbeat has occurred, and the external pacer operates in the usual demand mode.

But if what has been detected is not a natural heartbeat but rather a pacer pulse (from the implantable pacer), amplifier 42, in the absence of noise, causes transistors T2 and T3 to turn on so that a stimulating pulse is generated. This pulse reinforces the pulse from the implantable pacer to insure that a heartbeat is captured.

Even though the implantable pacer is operating in the continuous mode (because its sensing amplifier is inoperative), by setting the rate of the external pacer to be slightly slower than that of the implantable pacer, the external pacer can be controlled to operate in the demand mode whenever a spontaneous beat occurs; and the external pacer applies stimulating pulses in synchronism with those of the implantable pacer to insure heartbeat capture whenever a (sub-threshold) internal pulse is generated.

In the timing waveforms of FIGS. 3A–3E, representing the case where the sensing amplifier of the internal pacer is not functioning and the external pacer rate is made slower than the internal pacer rate, the large spikes represent pulses generated by the external pacer, the short thicker lines represent pulses generated by the implantable pacer, and the QRS waveforms are intended to depict heartbeats. Each of the five lines depicts a different condition.

The waveform of FIG. 3A depicts a condition in which the pulses generated by the implantable pacer are insufficient in amplitude to capture a heartbeat. In such a case, when each of these pulses is detected by the external pacer, a reinforcing external pacer pulse is generated, following which the patient's heart beats as shown for each of five cycles.

Figure 3B:
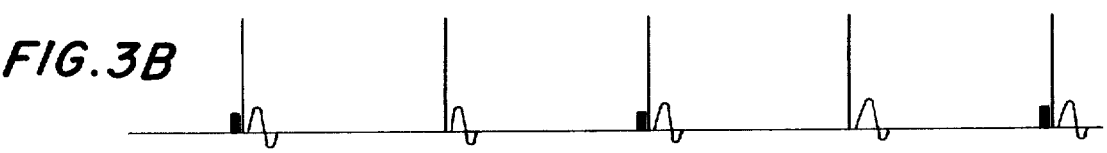

The condition depicted in FIG. 3B is one in which for one reason or another the rate of the implantable pacer has slowed down to half the previous value, but each of the implantable pacer pulses is still insufficient to capture a heartbeat. With respect to each of the three pulses generated by the implantable pacer, the external pacer is still triggered to generate a synchronous reinforcing pulse. But the external pacer also now operates in the conventional demand mode to generate a stimulating pulse (shown for the second and fourth cycles in FIG. 3B) in the absence of a spontaneous heartbeat.

Figure 3C:
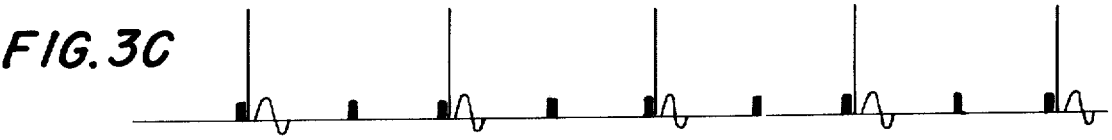

The condition depicted in FIG. 3C is that in which the level of each pulse generated by the implantable pacer is still below the threshold level required to stimulate a heartbeat, but the rate of the implantable pacer has increased. The condition depicted in FIG. 3C is a common one as a pacer fails. It will be observed that a reinforcing external pacer pulse is generated only for every other pulse from the implantable pacer which is detected. This is true despite the fact that amplifier 46 applies a positive pulse to the emitter of transistor T2 for each of the implantable pacer pulses. The reason that the external pacer does not generate pulses at the same rate at which the implantable pacer pulses are detected is that after capacitor 20 discharges through transistors T2 and T3 and a first external pacer pulse is generated, capacitor 20 only charges approximately to half of its maximum value by the time that the next implantable pacer pulse is detected. The voltage level across capacitor 20 is not high enough at this time to permit transistors T2 and T3 to turn on when amplifier 46 applies a pulse to the emitter of transistor T2. (In fact, the gain of amplifier 46 is adjusted to insure that its pulse output is high enough to control the generation of a pulse when capacitor 20 is in the terminal portion of each charging cycle, but is insufficient to control the generation of a pulse when the capacitor is only approximately half charged.) By the time the next pulse appears at the output of amplifier 46, capacitor 20 is nearing the end of its charging cycle, and the voltage across it is sufficient, in conjunction with the pulse at the output of amplifier 46, to control the turn-on of transistors T2 and T3. Consequently, it is apparent from FIG. 3C that even though the rate of the implantable pacer may increase as the pacer fails, the external pacer provides reinforcing pulses only for alternate implantable pacer pulses. The gain adjustment insures that a reinforcing pulse is generated only if an internal pacer pulse is detected after a predetermined time interval has elapsed following the last heartbeat.

Figure 3D:

In the example of FIG. 3D, it is assumed that the implantable pacer pulses occur at a proper rate, but that they are sub-threshold so that reinforcing pulses from the external pacer are required to stimulate heartbeats. But it is also assumed that two spontaneous heartbeats occur, shown in the third and fourth cycles. These spontaneous beats do not inhibit the generation of pulses by the implantable pacer if the sensing amplifier in that pacer is not operative. Consequently, implantable pacer pulses are shown in the third and fourth cycles in FIG. 3D. But because spontaneous beats occur, sensing amplifier 14 in the external pacer of FIG. 2 controls the turning on of transistor T1, the inhibition of pulses from the external pacer, and the start of new cycles.

Figure 3E:
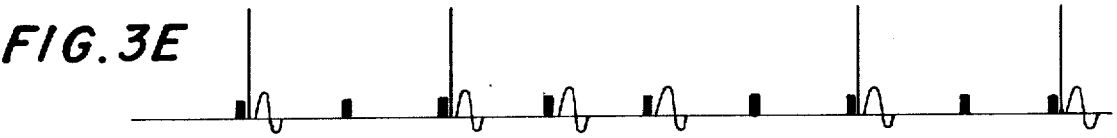

Finally, the condition depicted in FIG. 3E is the same as that depicted in FIG. 3C — the implantable pacer is operating at too fast a rate and not every detected pulse causes the external pacer to generate a reinforcing pulse — but it is now assumed that some of the pulses from the implantable pacer do capture heartbeats. The fourth and fifth implantable pacer pulses are shown as stimulating heartbeats. Whenever the implantable pacer does capture a heartbeat, sensing amplifier 14 in the external pacer detects this and prevents the generation of an external stimulating pulse. Since capacitor 20 discharges through transistor T1 whenever a heartbeat is detected by the external pacer, after the fifth implantable pacer pulse is generated, capacitor 20 is discharged. The next implantable pacer pulse, even though it results in a pulse being generated by the output of amplifier 46, does not result in the generation of an external pacer pulse because capacitor 20 is only approximately half-charged at this time. It is only the next implantable pacer pulse which does not capture a heartbeat that results in the generation of an external pacer pulse.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. An external heart pacer for supplementing the operation of the implantable heart pacer of a patient comprising electrode means for coupling to the heart of said patient, means for generating stimulating pulses on said electrode means, first means for detecting a patient heartbeat signal on said electrode means, means normally for controlling the periodic operation of said pulse generating means, means responsive to the detection of a heartbeat signal by said first detecting means for inhibiting the generation of a pulse by said pulse generating means and for restarting a period of its operation, second means for detecting an electrical signal on said electrode means indicative of the generation of a stimulating pulse by said implantable pacer, and means responsive to the operation of said second detecting means for controlling the generation of a pulse by said pulse generating means and for re-starting a period of its operation.

2. An external heart pacer in accordance with claim 1 further including means for varying the period of said pulse generating means, whereby the rate at which stimulating pulses are generated may be made slower than the rate at which stimulating pulses are generated by said implantable pacer so that the external pacer can operate in a demand mode.

3. An external heart pacer in accordance with claim 2 further including means for preventing the operation of said second detecting means from controlling the generation of a pulse by said pulse generating means if said second detecting means operates within a predetermined time interval following the termination of the previous period of operation of said pulse generating means.

4. An external heart pacer in accordance with claim 2 further including means for selectively disabling the operation of said first detecting means.

5. An external heart pacer in accordance with claim 4 further including means for preventing the operation of said second detecting means from controlling the generation of a pulse by said pulse generating means if said second detecting means operates within a predetermined time interval following the termination of the previous period of operation of said pulse generating means.

6. An external heart pacer for supplementing the operation of the implantable heart pacer of a patient comprising means for generating pulses, electrode means for coupling to a patient's heart, timing means for controlling the cyclic application of generated pulses to said electrode means, means for detecting electrical signals on said electrode means, and means responsive to the detected electrical signal on said electrode means representing a heartbeat for inhibiting the generation of a pulse and for starting a new cycle of operation of said timing means and responsive to the detected electrical signal on said electrode means representing a stimulating pulse from said implantable pacer for immediately controlling the generation of a pulse and for starting a new cycle of operation of said timing means.

7. An external heart pacer in accordance with claim 6 further including means for varying the period of operation of said timing means, whereby the rate at which pulses are generated may be made slower than the rate at which stimulating pulses occur from said implantable pacer so that the external pacer can operate in a demand mode.

8. An external heart pacer in accordance with claim 7 further including means for inhibiting the generation of a pulse within a predetermined time interval following the generation of a previous pulse or a heartbeat.

9. An external heart pacer in accordance with claim 6 further including means for inhibiting the generation of a pulse within a predetermined time interval following the generation of a previous pulse or a heartbeat.

10. An external heart pacer in accordance with claim 6 further including means for selectively controlling the continuous generation of pulses under control of said timing means independent of the operation of said detecting means.

* * * * *